Patented Sept. 10, 1946

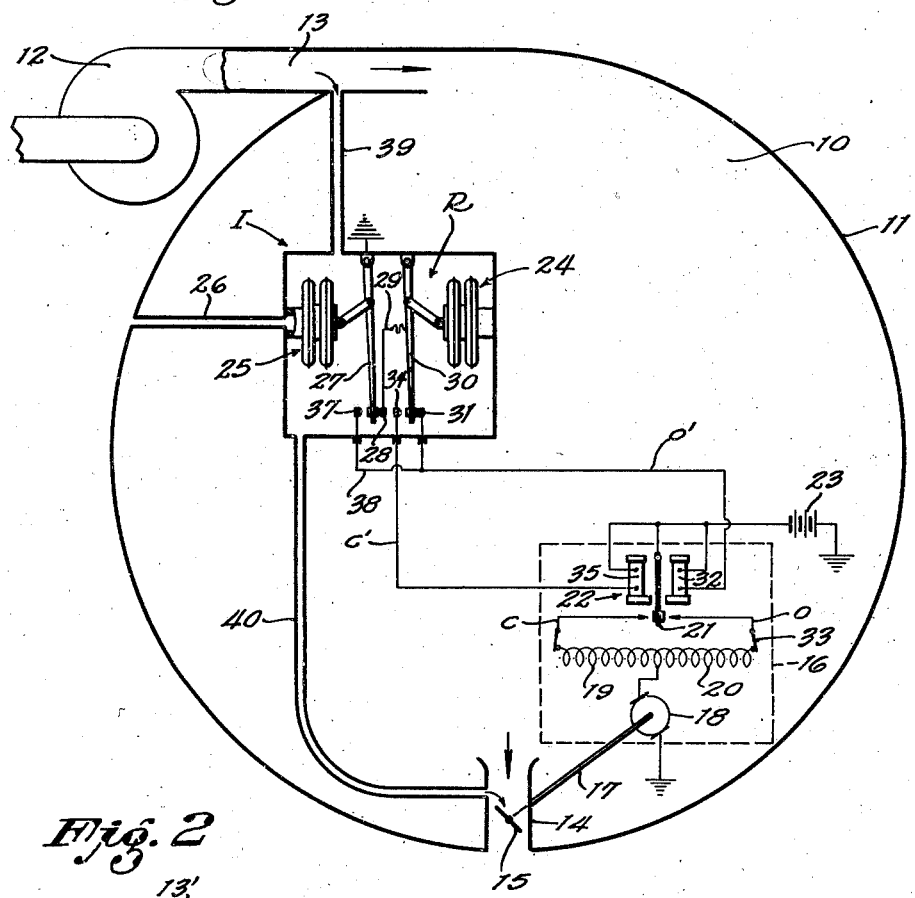

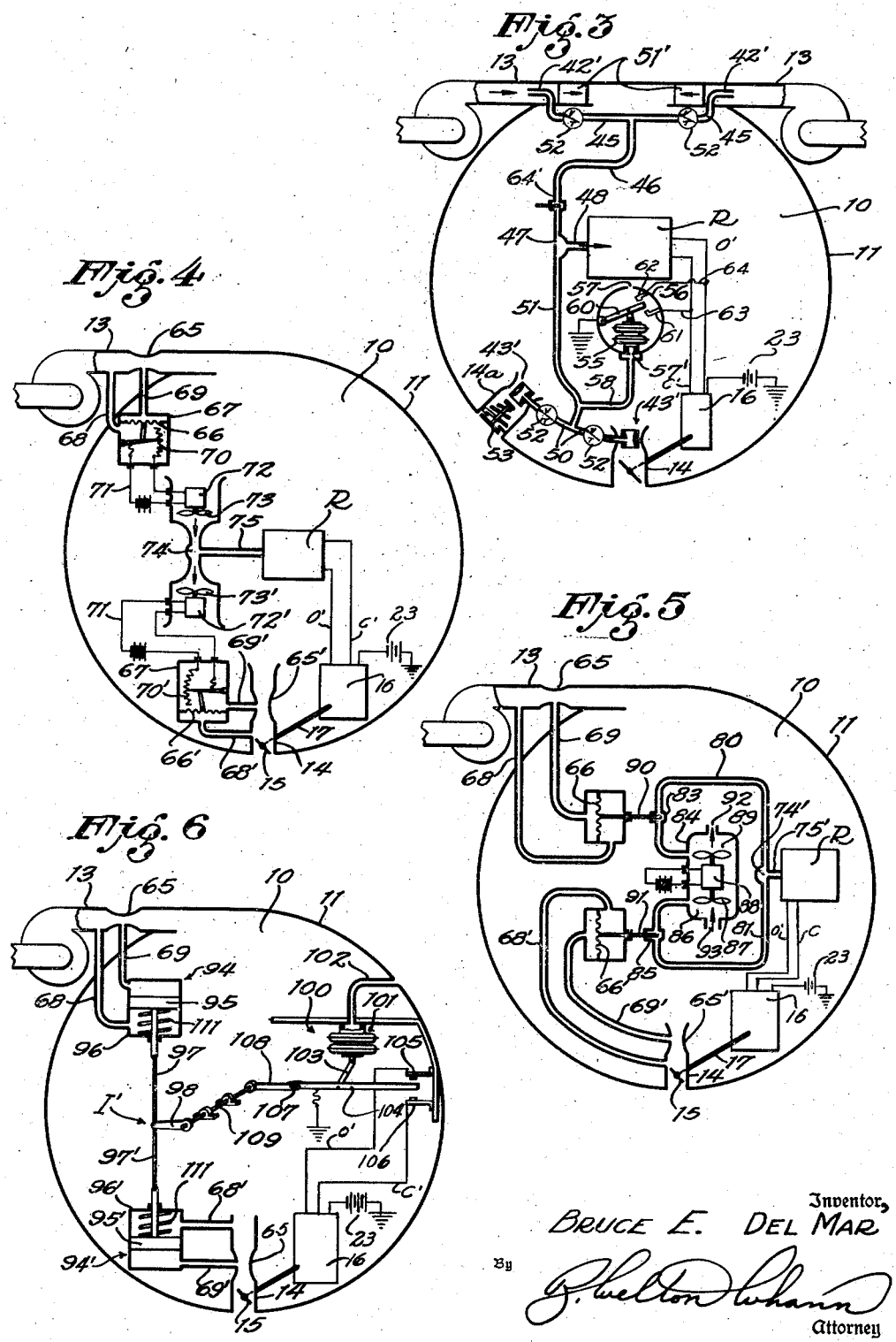

2,407,258

UNITED STATES PATENT OFFICE 2,407,258

CONTROL FOR PRESSURE CABINS

Bruce E. Del Mar, Los Angeles, Calif., assignor to Douglas Aircraft Company, Inc., Santa Monica, Calif., a corporation of Delaware Application June 6, 1942, Serial No. 446,039

31 Claims. (Cl. 98—1.5)

My invention relates to means for controlling pressure in pressure cabins of aircraft, or the like, and relates particularly to a system having therein or associated therewith anticipating means, whereby the action of the control will be rendered more sensitive to changes in pressure of air inside and/or outside the cabin. This application is a continuation-in-part of my copending application, Serial No. 429,901, filed February 7, 1942, for Regulating means for pressure cabin.

It is an object of the invention to provide in a system for control of pressure in a substantially airtight cabin or chamber, such as a cabin of an airplane, having as a part thereof elements which are responsive to changes in the relative flows of air entering and leaving the cabin or chamber.

As compared to the volume of air entering or leaving the cabin during a unit of time, the volume of the cabin space is ordinarily quite large, the result being that a change in flow into or out of the cabin does not immediately effect a change in the cabin pressure of sufficient magnitude to actuate pressure responsive elements. For example, let it be supposed that there is an increase in the outflow of air through the outflow opening of the cabin, such as would result in a reduction in the pressure within the cabin. Owing to the large volume of the cabin, it takes some time for sufficient air to exhaust in excess of the amount of air which is being fed into the cabin, to produce such change in the cabin pressure to actuate the pressure responsive control means. It will be seen therefore that from the time that the need for a change in the setting of the outlet valve occurs and the time the controls are actuated, there is a lag. Also, after the controls have been actuated as the result of the change in pressure conditions which affect the cabin, to operate the motor so as to start closing operation of the outlet valve, there will be a lag in the buildup of pressure within the cabin such as may be required to discontinue the closing operation of the outlet valve. This lag results in a condition referred to as hunting. My invention reduces this hunting action to a minimum, and therefore has a stabilizing effect on the controls so that the pressure within the cabin will be regulated so as to correspond closely to the schedule for which the control system is set or which is characteristic of it.

It is an object of the invention to provide a control system of the character described having an anticipator with air flow responsive elements disposed in the paths of flow of the incoming air and the outgoing air, with integrating means whereby the changes or effects occurring in the responsive elements are integrated and the summation of these effects is imposed on or used to control the cabin pressure regulator, which cabin pressure regulator may be any one of many known types or of the several types suggested in this disclosure.

A further object of the invention is to provide in apparatus for controlling pressure in cabins, an anticipator system wherein changes in airflow are magnified in such a manner that the sensitivity of the anticipator system is enhanced.

A further object of the invention is to provide in a control device of the character described an anticipator system providing an anticipator duct having one end thereof communicating with the inlet flow of air which is being fed into the cabin and the other end thereof communicating with the outlet flow of air, with a pressure chamber communicating with an intermediate part of this anticipator duct, said chamber having therein pressure responsive means forming a part of the cabin pressure control device.

It is a further object of the invention to provide an anticipator such as described in the preceding paragraph, having its inlet end connected to an impact tube and having its outlet end connected to a venturi, the impact tube being disposed in the path of flow of the entering air and the venturi being disposed in the path of flow of air leaving the cabin.

It is a further object of the invention to provide in a control device of the character herein described, an anticipator system which avoids the use of a duct or ducts leading from the zone of the regulator to the inlet and outlet zones of the pressure cabin, but having means associated with the inlet duct and the outlet duct of the cabin, or a plurality of these ducts for producing in the zone of the regulator, so that the regulator will be influenced thereby, a simulant cabin pressure varying in accordance with relative flows and pressures existing in the inlet and outlet paths of flow of air entering and leaving the pressure cabin.

Further objects and advantages of the invention will be brought out in the following part of the specification.

Referring to the drawings which are for illustrative purposes, only,

Fig. 1 is a schematic view showing a simple form of my invention.

Fig. 2 is a diagram illustrating the broad relation of parts in the invention.

Fig. 3 is a schematic view showing a form of the invention and illustrating the manner in which it may be employed with a plurality of blowers and outlets.

Fig. 4 is a diagrammatic view of an alternative form of my invention.

Fig. 5 is a diagrammatic view showing a further embodiment wherein the principles of the invention may be employed.

Fig. 6 is a diagrammatic view showing an embodiment of the invention employing mechanical integrating means.

In Fig. 1 I show a chamber 10 such as the interior of an aircraft cabin 11. Means are provided for feeding air into the cabin and discharging air therefrom in such relation that a pressure will be built up in the chamber 10. I have shown a blower 12 which feeds air into the chamber 10 through a duct 13, and an outlet passage or duct 14 having a valve 15 therein for control of the air which is being discharged from the cabin. The pressure in the chamber 10 depends upon the relative values of air inflow and air outflow. For example, by increasing the air inflow without change in the air outflow, the pressure in the chamber may be increased, or by adjusting the outlet valve 15 without change in the flow of air into the cabin through the duct 13, the pressure in the chamber 10 may be varied.

For operation of the means to vary the relation of the incoming and outgoing air flows, I provide a motivating unit 16 having a shaft 17 extending therefrom to operate the valve 15. For driving the shaft 17 a motor utilizing fluid energy is provided. Due to the close analogy between hydraulic motivation and electrical, it will be understood that in showing an electrical system within the motivating unit 16 equivalent hydraulic means may be employed. A motor 18 is provided which has driving connection with the shaft 17. This motor is of reversible type and has windings 19 and 20 included respectively in a closing circuit c and an opening circuit o, which circuits are closed when the contactor 21 of a relay 22 is moved either to the left or to the right from the neutral position in which it is shown in Fig. 1, whereby a source of power, shown as a battery 23, will be connected with either the winding 19 or the winding 20.

For control of the motivating unit 16 I provide a regulator including a sealed evacuated aneroid 24 which responds to a simulated cabin pressure, as will be hereinafter described. The regulator R also includes a means which is responsive to changes in the relation of pressure inside and outside the cabin 11. This means is shown as a capsule 25 having its interior connected through a duct 26 with external cabin pressure, or, in other words, with ambient flight pressure variations to which the cabin 11 is externally exposed.

When the cabin 11 is at a low altitude, for example—between sea level and eight or ten thousand feet—the differential pressure applied to the capsule 25 will be such that it will be relatively expanded and will hold a contactor 27 in engagement with a contact 28 which is connected by a conductor 29 with a contactor 30 connected to the aneroid 24, which, when the cabin pressure is above a prescribed value, will hold the contactor 30 in engagement with a contact 31, thereby closing the opening circuit o' which includes the right hand electromagnet 32 of the relay 22. As a result of this, the contactor 21 will be moved rightward so as to close the opening circuit o, with the result that the motor will be operated in a direction to fully open the valve 15, whereupon the opening circuit will be interrupted by the opening of a limit switch 33. As the aneroid 24 expands due to the lowering of the pressure within the cabin because of the opening of the valve, the contactor 30 will be moved leftward away from the contact 31 so as to engage a contact 34 forming a part of the closing circuit c', which includes the electromagnet 35 of the relay 22. The aneroid 24 will then operate to maintain the pressure within the chamber 10 of the cabin 11, constant, through opening and closing of the circuit c' resulting from the movement of the contactor 30 under control of the aneroid 24, this constant control of cabin pressure being maintained until the pressure differential between the chamber 10 and the ambient flight atmosphere is such as to collapse the capsule 25 and cause the contactor 27 to move leftward out of engagement with the contact 28 and into engagement with a contact 37 which is connected to the opening circuit o' through a branch conductor 38. Thereafter the differential control means, including the capsule 25, will act to control the motivating unit 16 so as to maintain in the chamber 10 a pressure following a predetermined schedule.

To avoid lag in the response of the regulator R to changes in air flow or pressure conditions which would eventually produce changes in the cabin pressure, a chamber I of small size is placed in a position surrounding the pressure responding elements 24 and 25. By means of the tube 39 this chamber I is connected with the inlet duct 13, and by a tube 40 is connected with the outlet duct 14. From the inlet duct 13 air flows through the tube 39 into the chamber I, and suction occurring at the lower mouth of the tube 40 causes air to be drawn through the tube 40 from the chamber I at a rate corresponding in general to the rate of flow outward through the outlet duct 14, but at greatly diminished volume due to the great difference in size of the duct 14 and the tube 40. The pressure existing in the chamber I is determined by the relative value of the incoming flow and outgoing flow of air through the tubes 39 and 40, in the same manner as the pressure in the chamber 10 depends upon the relation of the incoming flow and outgoing flow through the respective ducts 13 and 14, but, owing to the fact that the volume of the chamber I is minute as compared to the volume of the chamber 11, a change in the flow through either the duct 39 or the tube 40 will immediately produce a change in pressure in the chamber I; whereas, the change in the pressure in the chamber 10 is relatively slow. Under conditions of equilibrium, for example, when the aircraft is flying along at level flight, the pressure existing in the chamber I will be substantially the same as the pressure in the cabin 10, or, in other words, will be a simulant of cabin pressure. But, when any change occurs so as to disturb this condition of equilibrium, such change will be immediately reflected in a change in pressure in the chamber I and an immediate response of the regulator R.

It will be noted that the tubes 39 and 40 comprise means which define spaces, the flows and/or pressures in which are responsive to changes in the condition of air in the inlet path of flow of air into the chamber 10 or the outlet path of flow through which air is discharged from the chamber 10. Changes in velocity or pressure of the air in these inlet and outlet paths of flow will result in changes in the pressures and/or flows existing in the tubes 39 and 40. The values of pressure and/or flow in the tubes 39 and 40 are integrated in the chamber I. Accordingly, the chamber I constitutes an integrating means wherein these values are brought together and the summation thereof is applied so as to influence the operation of the regulator R which is representative of a number of different types of pressure responsive regulating means through which control of the motivating unit 16 may be accomplished.

In keeping with the foregoing explanation, Fig. 2 diagrammatically illustrates the broad conception of the invention. Therein the cabin 11 is shown as having means 13' to define a path of flow for the air fed into the cabin and means 14' defining a path of flow for air leaving the cabin. In cooperative relation to the paths of flow of air or the air flow through these paths, responsive elements 42 and 43 are placed. The effects produced in these responsive elements 42 and 43 are transmitted as indicated by dotted lines 44 and 45 to the integrating unit I which is associated with the cabin pressure regulator in such manner that the integrated effects are imposed upon the regulator R, so that the regulator R will be caused to act immediately in response to changes in velocity or pressure occurring in the inlet and outlet paths of flow. As indicated by the dotted line 46 of Fig. 2, the control function of the regulator R is transmitted to the motivating unit 16 so that suitable operation of the valve 15 will be accomplished.

As shown in Fig. 3, the responsive element 42 described with relation to Fig. 2 may comprise one or more impact or pitot tubes 42' disposed in one or more inlet ducts 13, and the responsive means 43 of Fig. 2 may be represented in Fig. 3 as one or more Venturi tubes 43' disposed in one or more outlets such as the outlets 14 and 14a. The impact tubes 42' are connected through branch ducts 45 with a duct 46 leading to an integrating chamber 47 which connects through a duct 48 with the pressure regulator R having control connection 46 with the motivating unit 16. The venturis 43' are connected through branch ducts 50 with a duct 51 leading to the integrating chamber 47. The branch ducts 45 and 50 have therein check valves 52, and the blower ducts 13 have therein check valves 51', which permit air to flow in the direction of the associated arrows so that in event of failure of a blower or of a valve, improper flow of air through the associated ducts cannot occur as the result thereof.

In Fig. 3 I have shown the manner in which the responsive elements 43' may be disposed in a plurality of outlet ducts, and I also indicate that one or more of these outlet ducts, such as the outlet duct 14a, may comprise a relief valve 53 set so as to open in response to a predetermined pressure differential between the interior and the exterior of the cabin. Also, in Fig. 3 I have shown a feature of my invention pertaining to the manner of incorporating a rate of climb meter in the control. This rate of climb meter comprises a capsule 55 disposed in a shell 56 having a small orifice 57 in its wall through which air under pressure existing in the cabin 10 may flow at a relatively slow rate into the interior of the shell. The interior of the capsule 55 is connected through a similarly small orifice 57' with a duct 58 which communicates with the duct 51 at a point between the chamber 47 and the outlet end of the duct, and preferably at a point near the outlet end of the duct 51.

Associated with the capsule 55 there is a control part 60 which is held in a neutral position intermediate a pair of spaced contacts 61 and 62 during stabilized conditions of operation.

Contact 61 is connected by a conductor 63 to the valve closing circuit C' while contact 62 is connected by conductor 64 to the valve opening circuit O'. The contacts are preferably mounted for relative movement to the end that each contact may be spaced varying distances from the neutral position of the control member 60. The control part 60 is grounded as shown and the contacts 61 and 62 are so connected into the opening and closing circuits respectively that the rate of climb meter will override or veto the controlling effect of the regulator R if the rate of pressure change within the cabin because of rapid ascent or descent of the aircraft exceeds some predetermined rate as determined by the relative position of the contacts 61 and 62.

In order that the pressure existing in the chamber 47 and in the regulator R may be held substantially equal to cabin pressure during stabilized conditions of operation, I provide in one of the ducts 46 or 51, as may be necessary, an orifice 64' to compensate for frictional resistance or pressure head which may be built up in one of these ducts in excess of the friction or pressure head built up in the other, due to differences in length, fittings, etc. The orifice is adjusted or set so that the pressure in the chamber 47 will be substantially simulated cabin pressure. The impact tubes 42' and the venturis 43 magnify the effects of the changes in the flow or pressure in the ducts 13, 14, and 14a, thereby greatly enhancing the sensitivity of the control.

In Fig. 4 I show a form of my invention wherein the effects produced in the responsive elements associated with the inlet and outlet paths of flow of air are transmitted to an integrating means through use of a medium other than air flow or pressure. Therein the inlet duct 13 is provided with a venturi 65. The flow responsive means consists of a diaphragm 66 disposed across a chamber 67 having connection, on opposite sides of the diaphragm 66, with ducts 68 and 69, connected to the inlet duct 13 at the venturi 65 and at a point adjacent thereto. The effects produced in the responsive element as the result of changes in flow of air through the duct 13 consists in changes in position of the diaphragm and corresponding changes in a rheostat 70 which in turn effects changes in flow of electric current through a circuit 71. The electrical circuit 71 includes a variable speed motor 72 which drives at variable speed an air pumping means represented by a propeller 73, which forces air into the upper end of a tube or chamber 74. Associated with the outlet duct 14 of Fig. 4 I have shown means which are substantially duplicates of the parts 65 to 73 above referred to. These duplicate parts are indicated by the same numerals as previously employed with prime marks added thereto. The motor 72' drives the fan 73' in a direction to draw air from the tube or chamber 74, with the result that the pressure produced at the mouth of the tube 75 which leads to the regulator R, is a function of the relative flows of air into and out of the chamber 74, and varies in accordance with the changes of air flow occurring in the ducts 13 and 14.

In Fig. 4 I have shown means whereby a simulated cabin pressure is produced in the chamber 74 by use of variable speed motors to produce variable flows of air into and out of the chamber 74. In Fig. 5 I show means whereby equivalent results are produced in a device having a constant speed motivating means to operate constant speed air pressure and air suction pumping means. In Fig. 5 I show a chamber 74' connected through a duct 75' with a regulator R. Air is fed into the chamber 74' through a duct 80 and is withdrawn therefrom through a duct 81. The duct 80 communicates through a valve 83 with a pump chamber 84, and duct 81 communicates through a valve 85 with the opposite end of the chamber 84 defining a space 86 wherein fan means 87 driven at constant speed by a motor 88 produces suction in the space 86 and air pressure in the space 89 of the chamber 84, the result being that air is urged under pressure through the pipe 80 into the chamber 74' and likewise suction in the space 86 tends to draw air from the chamber 74' through the duct 81. The valves 83 and 85 have closures 90 and 91 whereby the respective flows through the ducts 80 and 81 are varied, thereby varying the pressure produced in the chamber 74'. The diaphragms 66 and 66' of Fig. 4 are also shown in Fig. 5, whereby they are connected to the closures 90 and 91 to move the same, and these diaphragms are subjected to pressure differentials by use of the tubes 68 and 69 and 68' and 69' which are connected in the previously described relation through the venturi 65 and 65' of the inlet and outlet ducts 13 and 14. The chamber 84 has relief openings 92 and 93 at the ends thereof, through which variable amounts of air may pass in accordance with the restrictions placed on the flows of air through the tubes 80 and 81 by the closures 90 and 91 of the valves 83 and 85.

In Fig. 6 I show mechanical integrating means and mechanical linkages whereby the effects produced in flow responsive members are transmitted. In Fig. 6 I show an inlet duct 13 for feeding air into a pressure cabin, this duct having a venturi 65 as shown in Figs. 4 and 5. Similarly, I have shown outlet duct 14 with a venturi 65'. Pressure responsive means 94 and 94' are associated with the ducts 13 and 14. these responsive means comprising pistons 95 and 95' movable in cylinders 96 and 96' by pressure differentials imposed on opposite sides of the pistons 95 and 95' through ducts 68—69 and 68'—69'.

The respective upward and downward forces applied to the pistons 95 and 95' are transmitted by links or cables 97 and 97' to a lever 98 which forms a part of the integrating means I'. The lever 98 through opposed forces applied thereto by the members 97 and 97' will swing upward or downward in keeping with variations in the flows of air through the ducts 13 and 14. Accordingly, the positions of movements of the lever 98 and the parts associated therewith represent or are in accordance with the integrations of the effects produced in the responsive elements 94 and 94' by changes in flow or pressure in the ducts 13 and 14. These integrations are imposed on a regulator by use of mechanical means. To illustrate this, I have shown a regulator comprising a differential unit 100 having a capsule 101, the interior of which is connected through a duct 102 with ambient air pressure outside the cabin, the exterior of this capsule 101 being exposed to cabin pressure. By means of a link 103 the movable part of the capsule 101 is connected to a switch lever 104, the rightward end of which is arranged to swing between control contacts 105 and 106. The leftward end of the lever 104 is connected through a movable pivot 107 supported by a lever 108 which is connected to the lever 98 by means of a shaft 109.

It will be perceived that the lever 104 may be swung with relation to the contacts 105 and 106 by two separate means; it may be swung by vertical movement of the link 103 resulting from expansion and contraction of the capsule 101, or considering the link 103 as a pivotal support for the lever 104, this lever may be swung in cooperative relation to the contacts 105 and 106 by vertical movement of the pivot 107. Clockwise rotation of the lever 104 is accomplished by either downward movement of the link 103 or upward movement of the pivot 107.

A reduction in cabin pressure will result in a downward movement of the link 103 so as to carry the rightward end of the lever 104 toward the contact 106. Likewise, an increase in flow outward through the duct 14, such as would produce a reduction in pressure in the cabin space, will result in increase of the force acting downwardly on the piston 95', exerting a pull on the cable 97' to swing the lever 98 downward and rotate the shaft 109 in anticlockwise direction so as to raise the pivot 107 and thereby rotate the lever 104 in clockwise direction so that its rightward end will be swung downward toward the contact 106. Therefore, before material reduction in the cabin pressure has occurred, the anticipator system will have caused the contact 104 to move into engagement with the contact 106 which may form part of a closing circuit C', such as the circuit c' shown in Fig. 1, whereby the valve 15 will start to close, thereby reducing the outward flow through the duct 14 and relieving the piston 95' from the force which caused it to move downward, as previously described, whereupon the anticipator system will be returned to its neutral position by the action of resilient means such as springs 111 shown as being applied to the inner faces of the piston 95 and 95'.

It will be understood that a decrease in flow through the outlet 14 or an increase in flow through the inlet 13 will produce anticipation in opposite direction from that which has just been described by way of illustration, the switch lever 104 being now rotated in anticlockwise direction toward the contact 105 which is connected into the control circuit O' so as to accomplish opening of the valve 15.

I claim as my invention:

1. In regulating means for an aircraft pressure cabin, the combination of: supercharging means including an inlet duct through which air is delivered into said cabin; an outlet duct leading from said cabin; a flow regulating valve associated with at least one of said ducts; a servo apparatus arranged to control the aperture of said valve; a regulator subjected to cabin pressure and also to the differential between cabin pressure and external pressure, adapted to actuate said servo apparatus in response to changes from any predetermined relation of cabin pressure to external atmospheric pressure; and an anticipator device connected with said regulator and with said inlet duct and said outlet duct to transmit to said regulator the effects of changes in air flow within said ducts prior to any appreciable response of cabin pressure to pressure variations and surges within said ducts.

2. In an aircraft, a cabin adapted to be supercharged above the ambient atmospheric pressure, supercharging means comprising at least one blower, an inlet duct from said blower to said cabin, at least one outlet valve for discharging vitiated air from said cabin, an outlet duct leading from said cabin to said outlet valve, a servo apparatus arranged to control the aperture of said outlet valve, a regulator including elements responsive respectively to cabin pressure and the differential between cabin pressure and ambient pressure, adapted to actuate said servo apparatus in response to any departure of cabin pressure from a value functionally correlated to flight altitude pressure, and an anticipator device responsive to transient air pressure variations as well as to surges in the said inlet duct and in the said outlet duct and adapted to accelerate the otherwise normal functioning of the said regulator, the device comprising a conduit connecting the regulator with a region within the said inlet duct adjacent the blower wherein the air flow pressure is higher than cabin pressure, and a conduit connecting the regulator with a region within the said outlet duct adjacent the outlet valve wherein the air flow pressure is lower than cabin pressure, whereby the regulator will respond to pressure reaction within the conduits prior to the cabin pressure responding appreciably to pressure variations or surges within the said inlet and outlet ducts.

3. In an aircraft, a cabin adapted to be supercharged and having an outlet, blower means and a delivery duct for supplying air to said cabin at a pressure higher than that of the ambient flight atmosphere, means, including a regulator, for controlling cabin pressure with respect to flight pressure, and means providing for rapid regulator response to trends of cabin pressure variations, said means comprising a conduit connected with a region within said delivery duct adjacent the blower wherein the air flow pressure is higher than cabin pressure, and a conduit connected with a region of the cabin adjacent the cabin outlet wherein the air flow pressure is lower than cabin pressure, said regulator having a common control chamber in communication with both of said conduits and including means in said chamber directly and constantly responsive to transient fluctuations in the flows in said delivery duct and outlet region respectively, adapted to anticipate and prevent corresponding fluctuations in cabin pressure.

4. In pressure regulating means for an aircraft pressure cabin, the combination of: air flow means for delivering into and taking from the pressure cabin flows of air in such manner that the pressure in said cabin will be controlled, said air flow means defining an inlet path of flow for charging air and an outlet path of flow for discharging air; and regulating means operating to control said air flow means during flight so as to maintain in said cabin a pressure greater than the external atmospheric pressure, said regulating means comprising a chamber having an internal space which is a fraction of the volume of said cabin, pressure responsive means exposed to the pressure existing in said chamber, means actuated by said pressure responsive means for controlling the operation of said air flow means, and constantly open duct means connected to said air flow means contiguous to each of said paths of flow and connected to said chamber, said duct means being operative in consequence of relative changes in the flows of air in said paths of flow to produce in said chamber a simulated cabin pressure whereby said regulating means will act prior to the cabin pressure responding appreciably to pressure variations and surges in said paths of flow.

5. In pressure regulating means for an aircraft pressure cabin, the combination of: air flow means for delivering into and taking from the pressure cabin flows of air in such manner that the pressure in said cabin will be controlled, said air flow means defining an inlet path of flow for charging air and an outlet path of flow for discharging air; and regulating means operating to control said air flow means during flight so as to maintain in said cabin a pressure greater than the external atmospheric pressure, said regulating means comprising a chamber having an internal space which is a fraction of the volume of said cabin, pressure responsive means exposed to the pressure existing in said chamber, means actuated by said pressure responsive means for controlling the operation of said air flow means, and constantly open air ducts connecting said chamber to said air flow means contiguous to each of said paths of flow and operating in consequence of relative changes in the flows of air in said paths of flow to produce in said chamber a simulated cabin pressure whereby said regulating means will act prior to the cabin pressure responding appreciably to pressure variations and surges in said paths of flow.

6. In an aircraft the combination of: a cabin adapted to be supercharged; a blower for supplying air to said cabin at a pressure higher than that of the ambient flight atmosphere; an air inlet duct from said blower to said cabin; an air outlet duct from said cabin to the atmosphere; a valve in said outlet duct; means for operating said valve to vary the pressure in said cabin; means for controlling said operating means, said controlling means including pressure responsive means; and means, including means constantly responsive to pressure in said ducts for subjecting said pressure responsive means to simulated cabin pressure in response to pressure variations due to surges in said ducts, whereby to operate said valve and compensate for said pressure variations before the same materially change the pressure within said cabin.

7. Means for regulating the pressure of air in an aircraft cabin, comprising: airflow means for circulating a flow of air under pressure through the cabin and including inlet and outlet means; valve means for controlling such flow and thereby controlling the cabin pressure; pressure sensitive regulator means operative to control said valve means so as to maintain in said cabin a pressure greater than the external atmosphere pressure; and cabin pressure change anticipating control means constantly sensitive to transient changes in the flows in said inlet and outlet means respectively, and operative to effect an integrated resultant of such transient changes and to utilize said resultant to produce in said regulator means a response to said transient changes before any substantial change in cabin pressure can occur as a result of said transient changes.

8. Means for regulating the pressure of air in an aircraft cabin, comprising: airflow means for circulating a flow of air under pressure through the cabin including inlet and outlet means; valve means for controlling said flow and thereby controlling the pressure in the cabin; pressure sensitive regulator means for controlling said valve means so as to maintain in said cabin during flight a pressure greater than ambient atmospheric pressure, said regulator means including means defining a control chamber in which a simulated cabin pressure is normally maintained, a control element in said chamber responsive to such simulated cabin pressure and another control element in said chamber differentially responsive to such simulated cabin pressure and to ambient atmospheric pressure; and control means including means constantly responsive to both gradual and transient changes in flow in at least one of said inlet and outlet means, operative in response to said gradual changes to maintain said simulated cabin pressure in said chamber and operative, in response to said transient changes, to effect changes in said simulated cabin pressure and thereby to effect corrective action in the functioning of said regulator in anticipation and prevention of corresponding changes in cabin pressure tending to result from said transient changes.

9. Means for regulating the pressure of air in an aircraft cabin, comprising: airflow means for circulating a flow of air under pressure through the cabin and including inlet and outlet means; valve means for controlling such flow; pressure sensitive regulator means for controlling said valve means and thereby controlling the pressure in the cabin so as to maintain said cabin pressure at a level above that of ambient atmosphere during flight, said regulator including means defining a control chamber in which said simulated cabin pressures are normally maintained; a control element differentially sensitive to changes in ambient atmospheric pressure and to changes in such simulated cabin pressure and a second control element sensitive only to changes in said simulated cabin pressure; and control means comprising means sensitive to changes in the flows in said inlet means and in said outlet means respectively, said flow sensitive means being sensitive both to gradual and to transient flow changes, and being differentially operative, in response to said gradual flow changes, to maintain said simulated cabin pressure in said chamber and, in response to said transient changes, to vary the pressure in said control chamber in a manner to effect a corrective adjustment of said regulator means before any corresponding substantial change in cabin pressure can occur as a result of said transient changes.

10. Means for controlling the pressure of air in an aircraft cabin, comprising: airflow means for circulating a flow of air under pressure through the cabin and including inlet and outlet means; valve means for controlling such flow and thereby controlling the pressure in the cabin; pressure sensitive regulator means for controlling said valve means, said regulator means including means defining a chamber in which a simulated cabin pressure may be maintained and pressure sensitive control means within said chamber; control means comprising means sensitive to changes in the flows in said inlet means and in said outlet means respectively, said flow sensitive means being sensitive to both gradual and transient flow changes and being differentially operative, in response to said gradual flow changes, to maintain said simulated cabin pressure in said chamber and, in response to said transient changes, to vary the pressure in said control chamber in a manner to effect a corrective adjustment of said regulator means before any corresponding substantial change in cabin pressure can occur as a result of such transient changes.

11. Means for controlling the pressure of air in an aircraft cabin, comprising: airflow means for circulating a flow of air under pressure through the cabin including inlet and outlet means; valve means for controlling such flow and thereby controlling the pressure in the cabin; pressure sensitive regulator means for controlling said valve means, said regulator means including means defining a chamber in which a simulated cabin pressure may be maintained and pressure sensitive control means within said chamber; means for establishing and maintaining said simulated cabin pressure within said chamber, comprising a conduit and electrically operated means for forcing a fluid under pressure through said conduit into said chamber; and a plurality of electrical control means responsive to transient changes in the flows in said inlet and outlet means respectively, operative to control the actuation of said electrically operated means so as to change said simulated cabin pressure and thereby effect a corrective action upon the operation of said regulator before any substantial change in cabin pressure can occur as a result of said transient changes.

12. Mechanism for controlling the pressure of air in an aircraft cabin, comprising: airflow means for circulating a flow of air under pressure through the cabin and including inlet and outlet means; valve means for controlling such flow and thereby controlling the pressure in the cabin; pressure sensitive regulator means for controlling said valve means, said regulator means including a control element responsive differentially to cabin pressure and ambient atmospheric pressure, and an electrical switch operated by said control element; and cabin pressure change anticipating control mechanism for modifying the action of said control element on said switch, said anticipating mechanism comprising servo mechanism responsive differentially to transient changes in the flows in said inlet and outlet means respectively, and mechanical linkage connecting said servo mechanism to said switch, said anticipating mechanism functioning to effect corrective adjustment of said valve in response to said transient changes before any substantial change in cabin pressure can occur as a result of said transient changes.

13. Means for regulating the pressure of the atmosphere within an aircraft cabin, comprising: airflow means for circulating a flow of air under pressure through said cabin and including inlet and outlet means; valve means for controlling the flow of air through said air flow means so as to control the pressure of said cabin atmosphere; a pressure responsive regulator connected to said valve means for operating the same; and means defining a relatively small volume path of flow from said inlet to said outlet paralleling the flow through said cabin, said regulator including means sensitive to changes in pressure in said small volume path of flow at a point in said path where pressure will normally approximate pressure of the cabin atmosphere, whereby said regulator will normally control said valve in response to variations in cabin pressure, said small volume flow path being adapted to immediately transmit to said pressure sensitive means pressure changes resulting from transient changes in the flows in said inlet and outlet, respectively, whereby to anticipate and prevent corresponding changes in the pressure of the cabin atmosphere.

14. Means for regulating the pressure of air within an aircraft cabin, comprising: airflow means for circulating a flow of air under pressure through the cabin and including inlet and outlet means; valve means for controlling said flow so as to control the pressure of the air within the cabin; a regulator for controlling said valve means, said regulator including a control element responsive to changes in cabin pressure and a control element differentially responsive to changes in cabin pressure and in ambient atmospheric pressure and a pair of electric switches operated by said control elements respectively; a reversible electric servo motor for actuating said valve under the control of said regulator, together with electrical connections from said switches to said servo motor; and cabin pressure change anticipating control means sensitive to transient changes in the flows in said inlet and outlet means respectively and adapted to produce in said regulator a response to said transient changes before any substantial change in cabin pressure can occur as a direct result of said transient changes.

15. Means for regulating the pressure of air in an aircraft cabin, comprising: airflow means for circulating a flow of air under pressure through the cabin and including inlet and outlet means; valve means for controlling such flow and thereby controlling the cabin pressure; means for operating said valve means; a regulator for controlling said operating means; means constantly exposed to pressure changes in said inlet means, means constantly exposed to pressure changes in said outlet means, and means in communication with the two last named means, adapted to produce an integrated resultant of fluctuations in transient flows in said inlet and outlet means respectively, and to apply said resultant to the adjustment of said regulator in a manner to anticipate and prevent corresponding changes in cabin pressure tending to result from said transient fluctuations.

16. In a pressure regulating means for an aircraft cabin: airflow means for circulating a flow of air under pressure through the cabin and including inlet and outlet means; valve means for controlling such flow and thereby controlling the pressure in the cabin; pressure sensitive regulator means for controlling said valve means, said regulator means including means defining a chamber in which a simulated cabin pressure may be maintained and pressure sensitive control means within said chamber; means in constant communication with the flow of air in said inlet means, means in constant communication with the flow of air in said outlet means, and means in communication with the two last named means and adapted to effect an integrated resultant of transient fluctuations in the flows in said inlet and outlet means respectively, and to apply said resultant in the form of variations in pressure acting on said pressure responsive control means, whereby to effect the operation of said valve in a manner to anticipate and prevent any substantial change in cabin pressure tending to result from said transient fluctuations.

17. Means for regulating the pressure of air in an aircraft cabin, comprising: airflow means for circulating a flow of air under pressure through the cabin and including inlet and outlet means; valve means for controlling said flow and thereby controlling the pressure in the cabin; pressure sensitive regulator means for controlling said valve means so as to maintain in said cabin during flight a pressure greater than ambient atmospheric pressure, said regulator means including means defining a control chamber in which a simulated cabin pressure is normally maintained, a control element in said chamber responsive to such simulated cabin pressure and another control element in said chamber differentially responsive to such simulated cabin pressure and to ambient atmospheric pressure; and means for effecting, as an integrated resultant of fluctuations in the flows in said inlet and outlet means respectively, variations in the pressure in said chamber and adapted, in response to transient fluctuations in said flows, to effect a corrective adjustment of said regulator in anticipation and prevention of corresponding changes in cabin pressure tending to result from such transient fluctuations.

18. Means for regulating the pressure of air in an aircraft cabin, comprising: airflow means for circulating a flow of air under pressure through the cabin and including inlet and outlet means; valve means for controlling such flow and thereby controlling the pressure in the cabin; pressure sensitive regulator means for controlling said valve means, said regulator means including means defining a chamber in which a simulated cabin pressure may be maintained and pressure sensitive control means within said chamber; and means for establishing and maintaining said simulated cabin pressure within said chamber, comprising conduit means directly connecting said chamber to said inlet and outlet means respectively and adapted to transmit to said chamber both gradual and transient fluctuations in the flow in said inlet and outlet means respectively and to produce in said chamber, as the integrated resultant of said transient changes, pressure variations which will act through said pressure sensitive control means to anticipate and prevent corresponding changes in cabin pressure.

19. Means for regulating the pressure of air in an aircraft cabin, comprising: airflow means for circulating a flow of air under pressure through the cabin and including inlet and outlet means; valve means for controlling said flow and thereby controlling the pressure in the cabin; pressure sensitive regulator means for controlling said valve means so as to maintain in said cabin during flight a pressure greater than ambient atmospheric pressure, said regulator means including means defining a control chamber in which a simulated cabin pressure is normally maintained, a control element in said chamber responsive to such simulated cabin pressure and another control element in said chamber differentially responsive to such simulated cabin pressure and to ambient atmospheric pressure; and means for establishing and maintaining said simulated cabin pressure within said chamber, comprising conduit means directly connecting said chamber to said inlet and outlet means respectively and adapted to transmit to said chamber both gradual and transient fluctuations in the flows in said inlet and outlet means respectively and to produce in said chamber, as the integrated resultant of said transient changes, pressure variations which will act through said pressure sensitive control means to anticipate and prevent corresponding changes in cabin pressure.

20. In pressure regulating means for a pressurized aircraft cabin, the combination of: blower means for supplying air to said cabin at a pressure higher than that of the ambient flight atmosphere; an outlet from said cabin; a regulating device for controlling cabin pressure with respect to flight pressure; and means for increasing the rapidity of regulator response to trends of cabin pressure variations, said means comprising a conduit connecting the regulator with a region within the blower air delivery adjacent to the blower wherein the air flow pressure is higher than cabin pressure, and a conduit connecting the regulator with a region adjacent the cabin outlet wherein the air flow pressure is lower than cabin pressure, whereby pressure fluctuations at the blower and cabin outlet are transmitted directly to the regulator.

21. In pressure regulating means for a pressurized aircraft cabin, the combination of: airflow means for circulating a flow of air under pressure through the cabin and including inlet and outlet means, valve means for controlling such flow and pressure sensitive regulator means for controlling said valve means and thereby controlling the pressure in the cabin; and anticipating control means sensitive to transient changes in differential between quantities of flow in said inlet and outlet means, respectively, adapted to produce in said regulator means a response to said transient changes before any substantial change in the pressure of the cabin atmosphere can occur as a result of said transient changes.

22. In pressure regulating means for a pressurized aircraft cabin, the combination of: airflow means for circulating the flow of air under pressure through the cabin and including pressurizing inlet means, outlet means, valve means for controlling the discharge of air through said outlet means so as to control the pressure in the cabin, and pressure responsive regulator means for normally controlling said valve means; and anticipating control means sensitive to transient changes in differential between quantities of flow in said inlet and outlet means, respectively, adapted to produce in said regulator means a response to said transient changes before any substantial change in the pressure of the cabin atmosphere can occur as a result of said transient changes.

23. In pressure regulating means for a pressurized aircraft cabin, the combination of: airflow means for circulating a flow of air under pressure through the cabin and including inlet and outlet means, valve means for controlling said flow, and pressure sensitive regulator means for controlling said valve means and thereby controlling the pressure in the cabin; and anticipating control means sensitive to transient changes in the quantity of flow in at least one of said inlet and outlet means, adapted to produce in said regulator means a response to said transient changes before any substantial change in the pressure of the cabin atmosphere can occur as a result of said transient changes.

24. In pressure regulating means for a pressurized aircraft cabin, the combination of: airflow means for circulating a flow of air under pressure through the cabin and including pressurizing inlet means, outlet means, valve means for controlling said flow, a servo motor for operating said valve means, and pressure sensitive regulator means for controlling the operation of said servo motor and thereby controlling the pressure in the cabin through said valve means; and anticipating control means sensitve to transient changes in differential between quantities of flow in said inlet and outlet means, respectively, adapted to produce in said regulator means a response to said transient changes before any substantial change in the pressure of the cabin atmosphere can occur as a result of said transient changes.

25. In pressure regulating means for a pressurized aircraft cabin, the combination of: airflow means for circulating a flow of air under pressure through the cabin and including pressurizing inlet means, outlet means, valve means for controlling the release of air from the cabin through said outlet means, a reversible electric motor for operating said valve means, and a pressure sensitive regulator means including electric switching mechanism for controlling the operation of said motor; and anticipating control means sensitive to transient changes in differential between quantities of flow in said inlet and outlet means, respectively, adapted to produce in said regulator means a response to said transient changes, modifying the normal response of said regulator means before any substantial change in the pressure of the cabin atmosphere can occur as a result of said transient changes.

26. In pressure regulating means for a pressurized aircraft cabin, the combination of: airflow means for circulating a flow of air under pressure through the cabin and including inlet and outlet means, valve means for controlling said flow, and pressure sensitive regulator means for controlling said valve means and thereby controlling the pressure in the cabin, said regulator means including means defining a pressure chamber of restricted volume in which there is maintained air at a pressure, and pressure sensitive means within said chamber responding to changes in the pressure within the chamber and to changes in ambient flight atmospheric pressure; and anticipating control means adapted to transmit to said chamber a pressure derived as a differential result of the flows in said inlet and outlet means, respectively, whereby to normally maintain in said chamber a pressure equal to cabin pressure and varying in step with cabin pressure in response to gradual changes in said inlet and outlet flows, but effective in response to transient changes in said flows to change the pressure in said chamber in anticipation of corresponding changes in the pressure of the air within the cabin and to thereby actuate said regulator means to effect a corrective adjustment of said valve means so as to anticipate and prevent said corresponding changes in pressure in the cabin air.

27. In pressure regulating means for a pressurized aircraft cabin, the combination of: airflow means for circulating a flow of air under pressure through the cabin and including pressurizing inlet means, outlet means, and valve means for controlling said flow; and regulating means including anticipating control means sensitive to transient changes in the differential between quantities of flow in said inlet and outlet means, respectively, adapted to adjust said valve means to compensate for said transient changes before any substantial change in the pressure of the cabin atmosphere can occur as a result of said transient changes.

28. Means for regulating the pressure of air in an aircraft cabin, comprising: supercharging means including an inlet duct through which air is delivered into said cabin and an outlet duct for discharging air from said cabin; a cabin pressure regulating valve associated with at least one of said ducts; a servo system arranged to control the aperture of said valve; a regulator for controlling said servo system; and an anticipator system for controlling said regulator, said system being connected with said regulator and with said inlet and outlet ducts, adapted to transmit to said regulator the effect of changes of airflow within said ducts, in a manner to normally effect the actuation of said servo system in response to changes in the relation of cabin pressure to external atmospheric pressure, and being responsive to transient changes in the flows in said ducts in a manner to effect, through said regulator and servo system, stabilizing adjustment of said valve aperture in anticipation and prevention of corresponding transient changes in pressure in the air within the cabin.

29. Means for regulating the pressure of air in an aircraft cabin, comprising: airflow means for circulating air under pressure to the cabin and including inlet and outlet means; a valve for controlling the discharge of air through said outlet means so as to control the pressure of air in the cabin; regulating means for controlling the aperture of said valve, said regulating means including a pressure responsive element; and cabin pressure change anticipating means including fluid conduit means establishing communication between said inlet and outlet means and said pressure responsive element and directly subjecting said pressure responsive element to pressure changes resulting from changes in the flows of air in said inlet and outlet means, said anticipating means being adapted, in response to transient changes in the flows in said inlet and outlet means, to produce a stabilizing adjustment of said valve aperture before corresponding transient changes in the pressure of the air in the cabin can occur.

30. Means for regulating the pressure of air in an aircraft cabin, comprising: airflow means for circulating a flow of air under pressure through the cabin and including inlet and outlet means; valve means for controlling such flow and thereby controlling the cabin pressure; a regulator for controlling said valve means; and cabin pressure change anticipating means comprising means constantly exposed to pressure changes in said inlet means, means constantly exposed to pressure changes in said outlet means, and means in communication with both of said last named means, adapted to produce an integrated resultant of fluctuations in transient flows in said inlet and outlet means, respectively, and to apply said resultant to the adjustment of said regulator in a manner to anticipate and prevent corresponding changes in cabin pressure tending to result from said transient fluctuations.

31. Means for regulating the pressure of the air within an aircraft cabin, comprising: air flow means for circulating air under pressure through the cabin and including inlet and outlet means; a valve for controlling such circulation and thereby controlling the pressure of the air within the cabin; regulating means for controlling the aperture of said valve, including a pair of pressure responsive elements and servo mechanism for transmitting the response of said elements to said valve; and cabin pressure change anticipating means including conduit means for directly subjecting said responsive elements to variations in pressure resulting directly from changes in the flow in said inlet and outlet means, and adapted normally to cause the pressure to which said responsive elements are subjected to substantially equal cabin pressure, one of said pressure responsive elements being sensitive to both ambient atmospheric pressure and the pressure imposed thereon by said conduit and the other of said responsive elements being sensitive only to the pressure imposed thereon by said conduit means, said anticipating means being adapted in response to transient changes in the flow in said inlet and outlet means to effect stabilizing adjustment in the valve before corresponding transient changes in the pressure of the air within said cabin can occur.

BRUCE E. DEL MAR.